United States Patent
Shimbori et al.

(10) Patent No.: US 7,145,677 B2
(45) Date of Patent: Dec. 5, 2006

(54) PRINTING SYSTEM

(75) Inventors: Satoshi Shimbori, Kanagawa (JP); Hitoshi Ueno, Saitama (JP); Norihisa Haneda, Saitama (JP); Yoshihiro Ito, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 871 days.

(21) Appl. No.: 09/833,786

(22) Filed: Apr. 13, 2001

(65) Prior Publication Data
US 2002/0051180 A1 May 2, 2002

(30) Foreign Application Priority Data
Apr. 14, 2000 (JP) ............................ 2000-113930
Apr. 14, 2000 (JP) ............................ 2000-114012

(51) Int. Cl.
G06F 15/00 (2006.01)
G06K 1/00 (2006.01)

(52) U.S. Cl. .................. 358/1.15; 358/1.1; 358/1.14; 358/1.9; 709/203; 709/232

(58) Field of Classification Search ............... 358/1.15, 358/1.9, 463, 1.1, 1.14; 382/162; 348/97; 345/600, 604; 709/217, 203, 232; 715/530, 715/748; 707/9
See application file for complete search history.

(56) References Cited

U.S. PATENT DOCUMENTS

| | | | |
|---|---|---|---|
| 5,874,988 A * | 2/1999 | Gu ............................. 348/97 |
| 6,177,934 B1 * | 1/2001 | Sugiura et al. ............... 715/748 |
| 6,233,062 B1 * | 5/2001 | Takamatsu et al. ........... 358/463 |
| 6,304,277 B1 * | 10/2001 | Hoekstra et al. .............. 345/600 |
| 6,337,922 B1 * | 1/2002 | Kumada ...................... 382/162 |
| 6,404,509 B1 * | 6/2002 | Kuwata et al. ................ 358/1.9 |
| 6,449,639 B1 * | 9/2002 | Blumberg .................... 709/217 |
| 6,462,748 B1 * | 10/2002 | Fushiki et al. ............... 345/604 |
| 6,480,202 B1 * | 11/2002 | Deguchi et al. .............. 345/600 |
| 6,505,252 B1 * | 1/2003 | Nagasaka .................... 709/232 |
| 6,519,049 B1 * | 2/2003 | Nagasaka .................... 358/1.15 |
| 6,628,417 B1 * | 9/2003 | Naito et al. .................. 358/1.15 |
| 6,633,871 B1 * | 10/2003 | Jeyachandran et al. .......... 707/9 |
| 6,708,309 B1 * | 3/2004 | Blumberg .................... 715/530 |
| 6,734,985 B1 * | 5/2004 | Ochiai ........................ 358/1.15 |
| 6,738,152 B1 * | 5/2004 | Roth et al. ................... 358/1.14 |
| 6,775,023 B1 * | 8/2004 | Fukunaga et al. ........... 358/1.15 |
| 6,940,612 B1 * | 9/2005 | Murai .......................... 358/1.1 |
| 6,981,053 B1 * | 12/2005 | Nagasaka .................... 709/232 |
| 2002/0026359 A1 * | 2/2002 | Long et al. ................... 705/14 |
| 2003/0065718 A1 * | 4/2003 | Nagasaka .................... 709/203 |

* cited by examiner

*Primary Examiner*—Kimberly Williams
*Assistant Examiner*—Satwant Singh
(74) *Attorney, Agent, or Firm*—Sughrue Mion, PLLC

(57) ABSTRACT

A printing system for printing a color image provided via the Internet, includes: a terminal unit, connected to the Internet, operable to obtain the color image; a printer, connected to the terminal unit, operable to print the color image; and a correcting information provider operable to provide the terminal unit with correcting information for allowing the color image to be corrected in accordance with at least color characteristics of the printer, wherein the printer prints the color image by using the correcting information.

30 Claims, 13 Drawing Sheets

FIG. 5

| USER ID | TEL | PRINTER ID | PAPER TYPE | PAPER SIZE | USER COLOR-SETTING ||||| BRIGHTNESS CORRECTION | SHARPNESS CORRECTION |
|---|---|---|---|---|---|---|---|---|---|---|---|
| | | | | | Y CORRECTION | C CORRECTION | M CORRECTION | K CORRECTION | | | |
| 1 | XXXX-XXXX | 2 | CO. N, COATED PAPER | A4 | +1 | 0 | 0 | 0 | | NONE | NONE |
| 2 | 0000-0000 | 4 | CO. E, EXCLUSIVE PAPER | B5 | 0 | 0 | 0 | 0 | | NONE | +2 |
| 3 | AAAA-AAAA | 1 | CO. C, EXCLUSIVE PAPER | A4 | 0 | 0 | +1 | 0 | | −1 | NONE |
| | | | | | | | | | | | |
| | | | | | | | | | | | |

FIG. 7

| PRINTER TYPE ID | MAKER | TYPE | COLOR CONVERSION FUNCTION | | | |
|---|---|---|---|---|---|---|
| | | | Y | C | M | K |
| 1 | C CO. | IJ1997 | F1y(y, c, m, k, G, B, U) | F1c(y, c, m, k, G, B, U) | F1m(y, c, m, k, G, B, U) | F1k(y, c, m, k, G, B, U) |
| 2 | C CO. | IJ1998 | F2y(y, c, m, k, G, B, U) | F2c(y, c, m, k, G, B, U) | F2m(y, c, m, k, G, B, U) | F2k(y, c, m, k, G, B, U) |
| 3 | C CO. | IJ1999 | F3y(y, c, m, k, G, B, U) | F3c(y, c, m, k, G, B, U) | F3m(y, c, m, k, G, B, U) | F3k(y, c, m, k, G, B, U) |
| 4 | E CO. | C1111 | F4y(y, c, m, k, G, B, U) | F4c(y, c, m, k, G, B, U) | F4m(y, c, m, k, G, B, U) | F4k(y, c, m, k, G, B, U) |
| 5 | E CO. | C2222 | F5y(y, c, m, k, G, B, U) | F5c(y, c, m, k, G, B, U) | F5m(y, c, m, k, G, B, U) | F5k(y, c, m, k, G, B, U) |
| 6 | E CO. | C3333 | F6y(y, c, m, k, G, B, U) | F6c(y, c, m, k, G, B, U) | F6m(y, c, m, k, G, B, U) | F6k(y, c, m, k, G, B, U) |

160

| PAPER ID | PAPER TYPE | BRIGHTNESS-CORRECTING FACTOR | COLOR-CONVERSION FACTOR |
|---|---|---|---|
| 1 | CO. N, COATED PAPER | +1 | G1 |
| 2 | CO. E, EXCLUSIVE PAPER | −1 | G2 |
| 3 | CO. G, EXCLUSIVE PAPER | +3 | G3 |

| PAPER ID | PAPER TYPE | FILE NAME OF ICC PROFILE |
|---|---|---|
| 1 | CO. N, COATED PAPER | N_COATEDPAPER.icm |
| 2 | ⋮ | ⋮ |
| 3 | ⋮ | ⋮ |

| URL | TOTAL NUMBER OF PRINTING REQUESTS | RANKING OF TOTAL NUMBER OF PRINTING REQUESTS | NUMBER OF PRINTING REQUESTS PER DAY |
|---|---|---|---|
| http://www.abcdef.co.jp | 560 | 1 | 30 |
| http://www.ghijklmn.co.jp | 230 | 3 | 26 |
| http://www.opqrst.co.jp | 490 | 2 | 36 |

PRINTING SYSTEM

This patent application claims priority based on a Japanese patent applications Nos. 2000-113930 filed on Apr. 14, 2000, 2000-114012 filed on Apr. 14, 2000, the contents of which are incorporated herein by reference.

BACKGROUND OF THE INVENTION

1. Field of the Invention

The present invention relates to a printing system. More particularly, the present invention relates to a printing system for printing an image obtained on the Internet by using information for correction in accordance with a type of a printer.

2. Description of the Related Art

As the Internet becomes popular, advertisements and catalogs of various items have been presented on the Internet. Information such as the advertisements and the like is often announced on television. On the other hand, a high-quality color printer for home-use becomes popular and therefore it becomes easy to perform color printing at home. Thus, the advertisement and the like announced on the television can be printed to be looked through.

However, an image provided on the Internet that is announced on the television is performed without considering color characteristics unique to each printer.

The color characteristics of each printer may be different from those of other printers. In a case of printing the same color, for example, red, a particular printer may reproduce bluish red while another printer may reproduce orangey red. For this reason, parameters related to setting of the color characteristics can be changed by the user for most printers. However, when the image provided on the Internet is printed, the image is not printed with the colors to be reproduced in some cases. This is a problem especially in a case where the provided image is an advertisement of an item, because it is important to correctly reproduce the colors of the item shown on the advertisement.

SUMMARY OF THE INVENTION

Therefore, it is an object of the present invention to provide a printing system, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, printing system for printing a color image provided via the Internet, includes: a terminal unit, connected to the Internet, operable to obtain the color image; a printer, connected to the terminal unit, operable to print the color image; and a correcting information provider operable to provide the terminal unit with correcting information for allowing the color image to be corrected in accordance with at least color characteristics of the printer, wherein the printer prints the color image by using the correcting information.

The correcting information provider may be connected to the terminal unit. It is preferable that the correcting information provider is connected to the terminal unit via the Internet.

In an embodiment of the present invention, the correcting information provider includes a printer type database for storing information regarding color characteristics for each type of the printer, and the correcting information provider provides the correcting information obtained by color correction based on the contents of the printer type database. The information regarding the color characteristics may be a color correction table to be used for the color correction in accordance with the color characteristics of the printer.

In an embodiment of the present invention, the correcting information provider provides the correcting information in accordance with at least color characteristics of the printer and a type of paper to be used by the printer. The correcting information provider may include a user-setting information database for storing printer-setting information regarding a current color setting of the printer, a type and a size of paper to be used by the printer, and the correcting information provider provides the correcting information based on the printer-setting information.

The terminal unit may transmit a type of paper currently accommodated in the printer to the correcting information provider, the correcting information provider determines whether or not the current paper type is the same as the paper type stored in the user-setting information database, and notifies the terminal unit that the current paper type is different from the stored paper type stored when the paper types are different from each other.

The correcting information provider may include a correction notifying unit operable to notify the terminal unit that the current setting is out of a predetermined region for a desired setting. Also, the correcting information provider may include a layout unit operable to make a layout of the image based on the size of paper.

The user-setting information database may store information regarding brightness and sharpness of the color image, and the correcting information provider may provide the correcting information based on the printer-setting information and the information regarding the brightness and the sharpness of the color image.

In an embodiment of the present invention, the correcting information provider includes: an image obtaining unit operable to obtain the image from the Internet; and an information presenting unit operable to present the color image to the terminal unit, wherein the terminal unit obtains the image via the information presenting unit.

In an embodiment of the present invention, the correcting information provider includes a correction notifying unit operable to notify the terminal unit the contents of correction to be performed for the image. The correction notifying unit determines whether or not the color characteristics of the printer are in normal regions, and notifies the terminal unit that the color characteristics are abnormal when the color characteristics of the printer are out of the normal regions.

In an embodiment of the present invention, the terminal unit includes: an image receiving unit operable to receive the color image; an image displaying unit operable to display the color image received; and a correcting information requesting unit operable to request the correcting information provider to provide the terminal unit with the correcting information corresponding to the color image.

The terminal unit may further includes: a printer-setting obtaining unit operable to obtain a current setting of the printer; and a printer-setting information transmitting unit operable to transmit the current setting of the printer to the correcting information provider when the terminal unit requests the transmission of the correcting information to the correcting information provider.

In an embodiment of the present invention, the correcting information provider includes a storing unit operable to store the correcting information so as to allow re-use of the correcting information. The correcting information may determine whether or not the correcting information is stored in the storing unit, and reads the correcting information when it is determined that the correcting information is stored and transmits the read correcting information to the terminal unit.

In an embodiment of the present invention the printing system further includes: an information sending apparatus operable to provide the color image on the Internet; and an information notifying apparatus operable to provide location information indicating a location of the color image on the Internet method, wherein the correcting information provider obtains the color image based on the location information and provides the correcting information corresponding the color image to the terminal unit.

The correcting information provider may include a request number database operable to store the number of printing requests for each of a plurality of color images. In this case, the correcting information provider notifies the information notifying unit the number of the printing requests in a predetermined period. Also in this case, the terminal unit includes: a receiving unit operable to receive the location information; and a correcting information requesting unit operable to request the correcting information provider to provide the terminal unit with the correcting information corresponding to the color image and to transmit the location information to the correcting information provider. Moreover, the terminal unit may further include: a printer-setting obtaining unit operable to obtain a current setting of the printer; and a printer-setting information transmitting unit operable to transmit the current setting of the printer to the correcting information provider when the terminal unit requests the transmission of the correcting information to the correcting information provider.

According to a second aspect of the present invention, a printing method for printing a color image provided via the Internet by means of a printer connected to the Internet, includes: obtaining a current setting of the printer; obtaining the color image from the Internet; and providing the printer with correcting information for allowing the color image to be corrected in accordance with the current setting of the printer; and printing the color image by using the correcting information. It is preferable that the current setting of the printer includes at least color characteristics of the printer. The current setting of the printer may include a size and a type of paper to be used by the printer, and the printer prints the color image by using the correcting information provided in accordance with the color characteristics of the printer and the size and type of the paper.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 5 shows an exemplary user-setting information database.

FIG. 7 shows an exemplary printer type database.

FIG. 8 shows an exemplary paper type database.

FIG. 9 shows an exemplary ICC profile database.

FIG. 10 shows an exemplary request number database.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
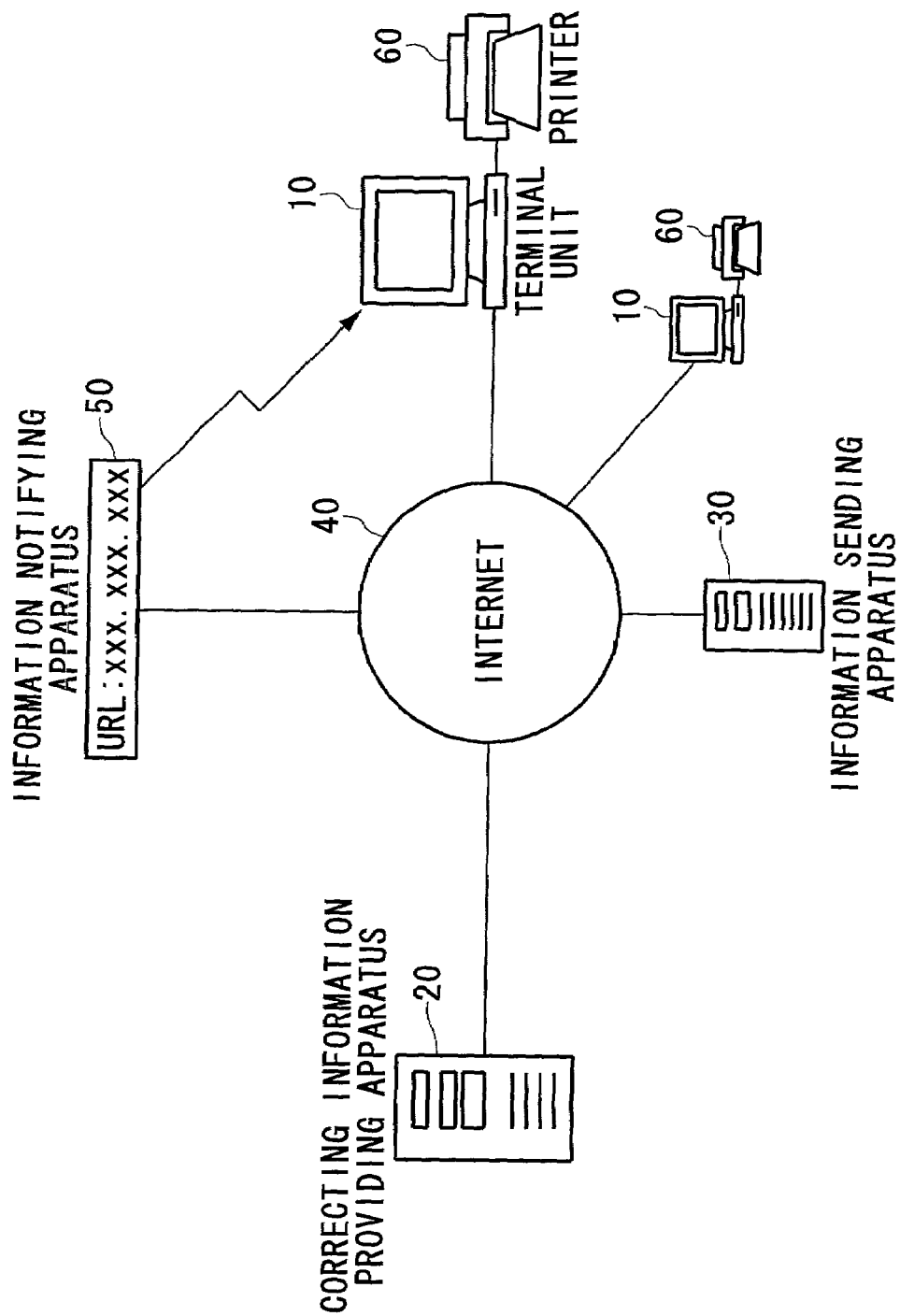
FIG. 1 schematically shows a printing system according to an embodiment of the present invention.

FIG. 1 schematically shows a printing system according to an embodiment of the present invention. In the printing system, a terminal unit 10 is connected to the Internet 40 and can print information provided via the Internet 40 by using a color printer 60 connected to the terminal unit 10. The terminal unit 10 includes a display unit for displaying the provided information to allow the user to view and an input device (not shown) allowing an input of a user's instruction to the terminal unit 10.

In general, an image contained in the information provided on the Internet 40 is supplied to the terminal unit 10 in form of RGB data. The terminal unit 10 receives such RGB data and reproduces the image. On the other hand, a typical color printer 60 reproduces colors by subtractive mixture. Thus, in order to print the information containing the image, that is displayed by the terminal unit 10, it is necessary to perform color conversion from an RGB color system to a CMYK color system. The color conversion is typically performed by the terminal unit 10.

To the Internet 40, an information sending apparatus 30 and a correcting information providing apparatus 20 are also connected. The information sending apparatus 30 can provide information containing an image to the terminal unit 10 via the Internet 40. As the information provided by the information sending apparatus 30, an advertisement of an item or service may be provided, for example. The correcting information providing apparatus 20 can provide correcting information that allows the image provided via the Internet 40 to be printed by the printer 60 with colors to be reproduced, such as colors of the image that are displayed on the terminal unit 10 and recognized by eyes of the user, by taking a printing environment of an individual printer into consideration. The corrected information is provided to the terminal unit 10 via the Internet 40.

An information notifying apparatus 50 is also connected to the Internet 40 so as to provide entertainment information, news, and an advertisement of an item or a service to the terminal unit 10. The information notifying apparatus 50 may be a television set or an Internet television set, for example. The information notifying apparatus 50 may show a location of the information sending apparatus 30 that serves as a source of the advertisement, such as a URL on WWW. In this case, the terminal unit 10 obtains the provided information by accessing a Web page having the shown URL. Also, the correcting information providing apparatus 20 obtains the provided information for which the correcting information is generated by accessing the Web page.

The correcting information providing apparatus 20 may receive the information to be corrected directly from the Internet 40 or by accessing the Web page as described above.

Figure 2:
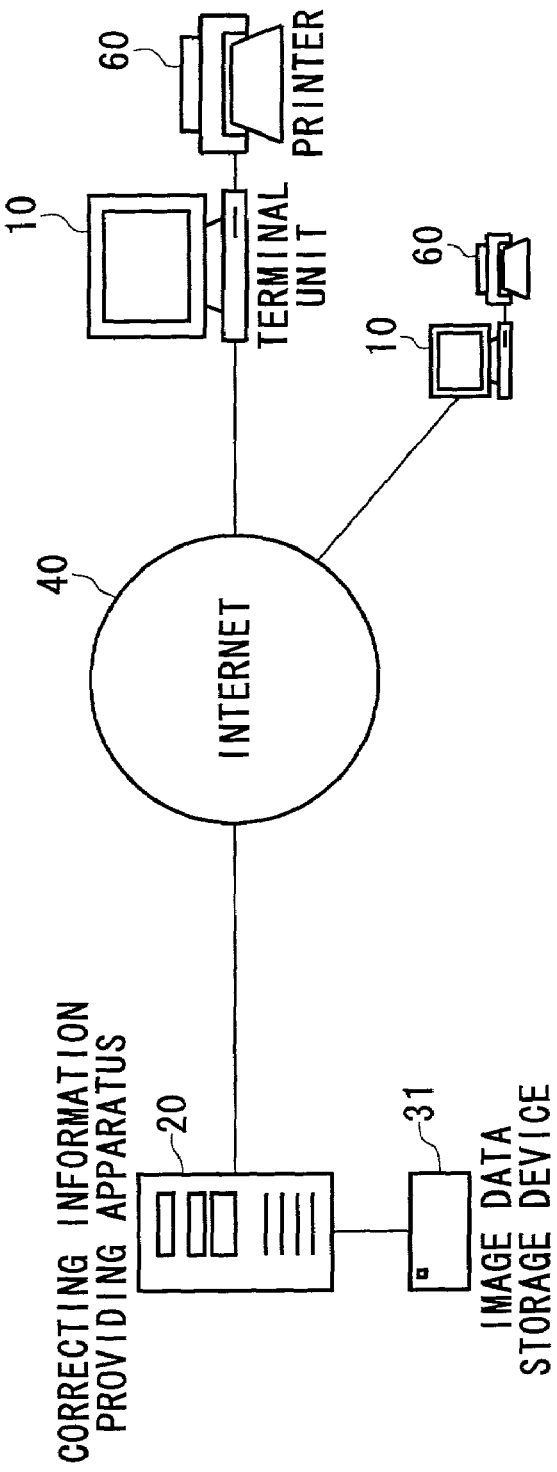
FIG. 2 schematically shows a printing system according to another embodiment of the present-invention.

FIG. 2 schematically shows a printing system according to another embodiment of the present invention. In the present embodiment, the correcting information providing apparatus 20 includes an image data storage device 31 storing image data for which the correcting information is to be provided in accordance with a type of printer 60. The correcting information providing apparatus 20 generates the correcting information that helps the image data to be printed with colors to be originally reproduced, in accordance with the type of the printer 60, and sends a URL of a web page on which the corrected image is shown to the terminal unit 10 The user prints the corrected information indicated by the URL.

Figure 3:
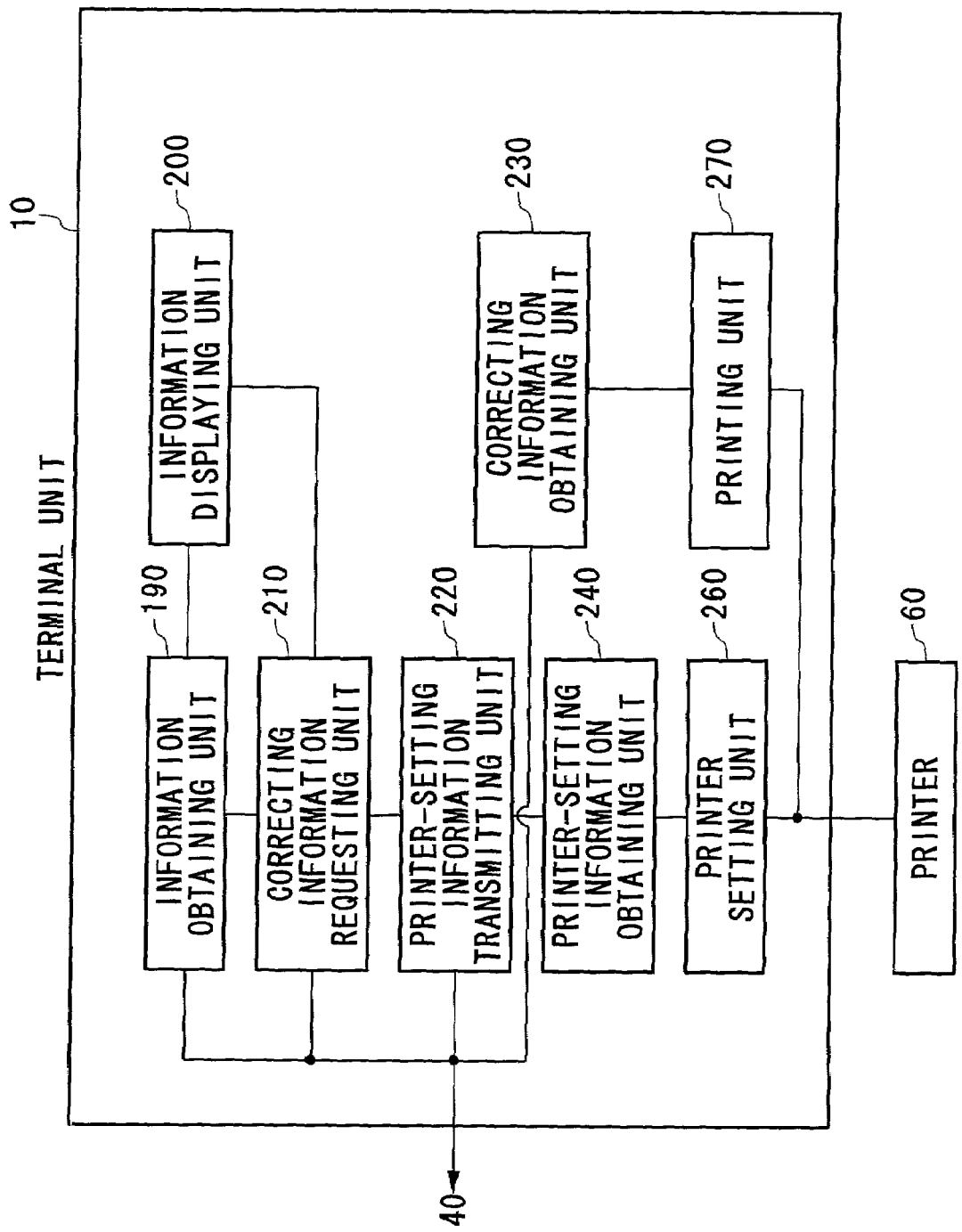
FIG. 3 illustrates an exemplary structure of a terminal unit included in the printing system of the present invention.

FIG. 3 schematically shows the terminal unit 10. Components included in the terminal unit 10 are described below. An information obtaining unit 190 obtains the provided information from the Internet 40. The provided information is then displayed by an information displaying unit 200 so as to allow the user to view the provided information. A correcting information requesting unit 210 requests the correcting information providing apparatus 20 to transmit correcting information corresponding to the provided information that is required for printing the provided information displayed on the information displaying unit 200.

The information obtaining unit 190 may receive location information indicating a location of the provided information, such as a URL of a Web page shoeing the provided information, from the information notifying apparatus 50. In this case, the information obtaining unit 190 accesses the Web page provided by the information sending apparatus 30, thereby obtaining the provided information. Also in this case, the correcting information requesting unit 210 sends the location information of the provided information to the correcting information providing apparatus 20 together with the transmission request of the correcting information.

A printer setting unit 260 sets parameters regarding color characteristics, sharpness and brightness of the printer 60. A printer-setting information obtaining unit 240 obtains values of the parameters set by the printer setting unit 260. A printer-setting information transmitting unit 220 transmits the parameter values obtained by the printer-setting information obtaining unit 240 to the correcting information providing apparatus 20 as the printer-setting information so that the parameter values are used for preparing the correcting information.

A correcting information obtaining unit 230 of the terminal unit 10 obtains the correcting information from the correcting information providing apparatus 20. A printing unit 270 makes the printer 60 to print the provided information by using correcting information.

Figure 4:
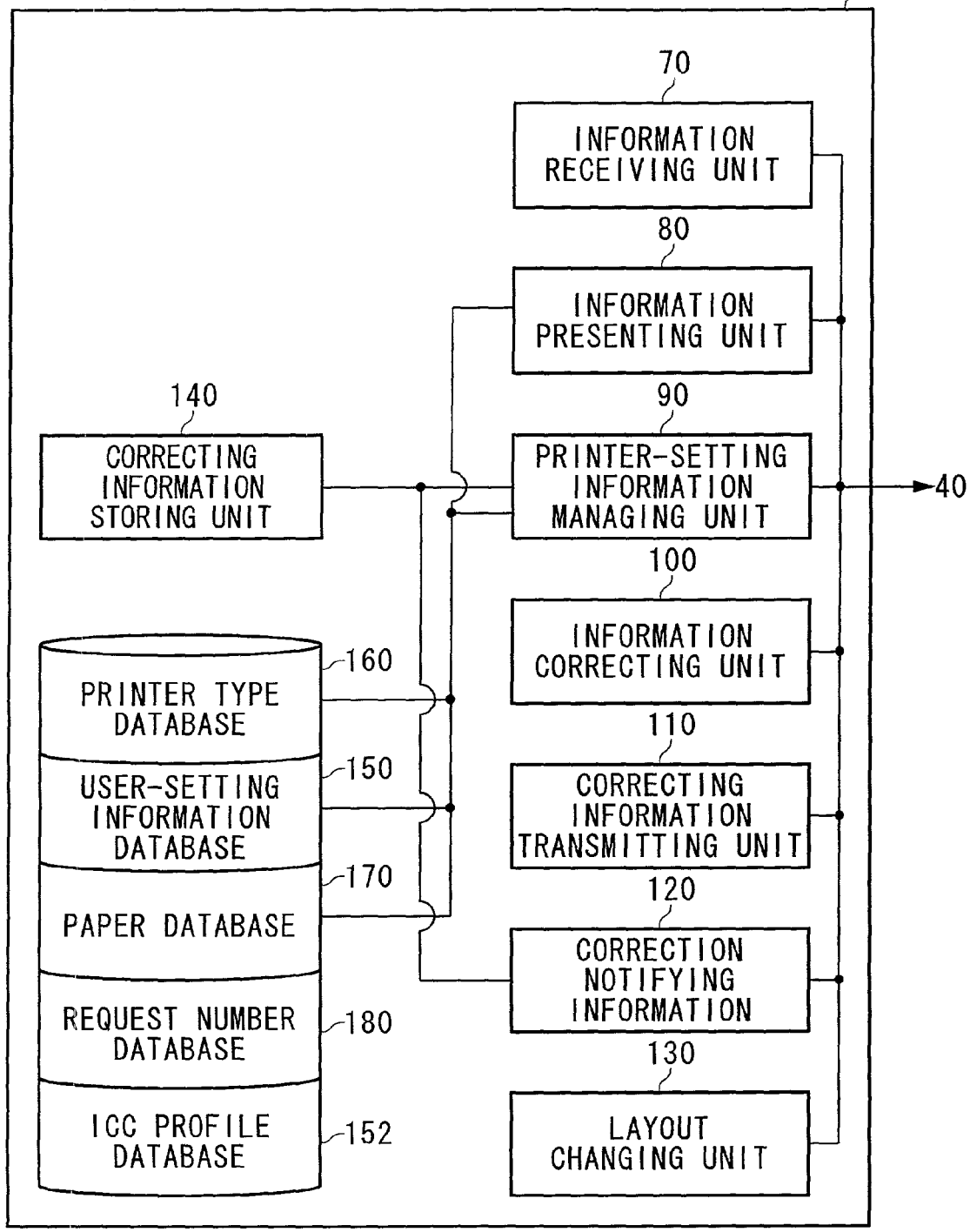
FIG. 4 illustrates an exemplary structure of a correcting information providing apparatus included in the printing system of the present invention.

FIG. 4 schematically shows the correcting information providing apparatus 20. The correcting information providing apparatus 20 mainly includes a part that receives the provided information from the Internet 40 to present it to the terminal unit 10 and another part that is related to various databases and the correcting information. Components included in the correcting information providing apparatus 20 are described below, referring to FIG. 4.

An information receiving unit 70 receives the provided information containing an image from the Internet 40 to store it therein. The provided information is then provided to the terminal unit 10 by an information presenting unit 80.

The correcting information providing apparatus 20 includes a user-setting information database 150, a printer type database 160, a paper database 170 and a request number database 180, as shown in FIG. 4. In addition to these four databases, the information providing apparatus 20 may include an ICC profile database 152 which stores ICC (International Color Consortium) profiles each of which defines an RGB setting or a CMYB setting for a printer. Each of databases 150, 160, 170, 180 and 152 is described in detail with reference to an example later.

A printer-setting information managing unit 90 receives information regarding the color characteristics of the printer 60 and information specifying a type of the printer 60 that are transmitted from the terminal unit 10. The received information is recorded in the user-setting information database 150. Data stored in the user-setting information database 150 can be read and used, as described in detail later.

An information correcting unit 100 corrects the provided information containing the image that is to be corrected in accordance with the type and the color characteristics of the printer and the paper type to used for printing, based on various functions and factors related to color correction stored in the user-setting information database 150, the printer type database 160 and the paper type database 170, thereby generating correcting information. The correcting information thus generated is transmitted to the terminal unit 10 via a correcting information transmitting unit 110. Moreover, the correcting information may be stored in a correcting information storing unit 140. In this case, the correcting information can be re-used when it is requested to generate the correcting information for another printer having the same type and the same color characteristics and using the same type of paper.

The correcting information providing apparatus 20 further includes a correction notifying unit 120, as shown in FIG. 4. The correction notifying unit 120 notifies the terminal unit 10 the result of the color conversion based on the color characteristics and the type of the printer and the type of paper that are to be used for printing. Thus, the user, who operates the terminal unit 10, can find the difference between the colors printed on the printer the user is to use and the colors to be reproduced originally.

A layout changing unit 130 changes a layout of the correcting information in accordance with the size of paper to be used for printing.

FIG. 5 shows an exemplary contents of the user-setting information database 150. The user-setting information database 150 is used for generating the correcting information in accordance with the color characteristics of the printer 60. As described before, the user may change a default setting of the individual printer. Thus, in order to generate the correcting information in accordance with the current setting that may be the default setting or the setting set by the user, the current setting is required for the correcting information providing apparatus 20. Therefore, the correcting information providing apparatus 20 receives the current setting from the terminal unit 10 via the Internet 40 and stores it in the user-setting information database 150.

The user-setting information database 150 of this example stores a user ID for specifying the user, a printer ID for specifying the printer to be used, a paper type and a paper size that indicate the type and size of the paper to be used, parameters of the color characteristics set by the user, a value representing the brightness and a value representing the sharpness, as shown in FIG. 5. The user-setting information database 150 may further include contact information of the user, for example, a phone number or e-mail address. Using the user-setting information database 150, a centralized managing of settings can be performed for a plurality of printers 60.

Each field of the user-setting information database 150 is described. The user ID is uniquely assigned to each user and thus can specify the user. For the contact information of the user, the phone number is stored in this example. As described above, e-mail address may be stored in place of the phone number. The printer ID is uniquely assigned to each type of printer and thus can specify the printer type. For example, a particular printer ID is assigned to a printer of model X, Company C, while another printer ID is assigned to a printer of model Y, Company N. Printers of the same model of the same company have the same printer ID.

The color characteristics set by the user, U, include four parameters, i.e., an yellow parameter (Y), a cyan parameter (C), a magenta parameter (M) and a black parameter (K) in this example. The user can change these parameters for obtaining desired color characteristics. In alternative embodiment, the color characteristics set by the user may include additional color parameters, such as light cyan, light magenta or the like. Referring to FIG. 5, a value "0" indicates no change in hue. Other values in the user-color setting fields indicate that a change in hue in accordance with the values should be performed. The details of the change in hue are described in later referring to FIG. 6.

The brightness field stores a parameter that can change the brightness of the image that will be printed on the paper. The parameter is in a range of −10 to +10, where the positive values indicate that the brightness should be increased. The sharpness field stores a parameter for changing the sharpness of a profile of the image that will be printed on the paper. The parameter is in a range of −10 to +10, where the positive values indicate that the profile should be corrected to be clearer.

Figure 6:
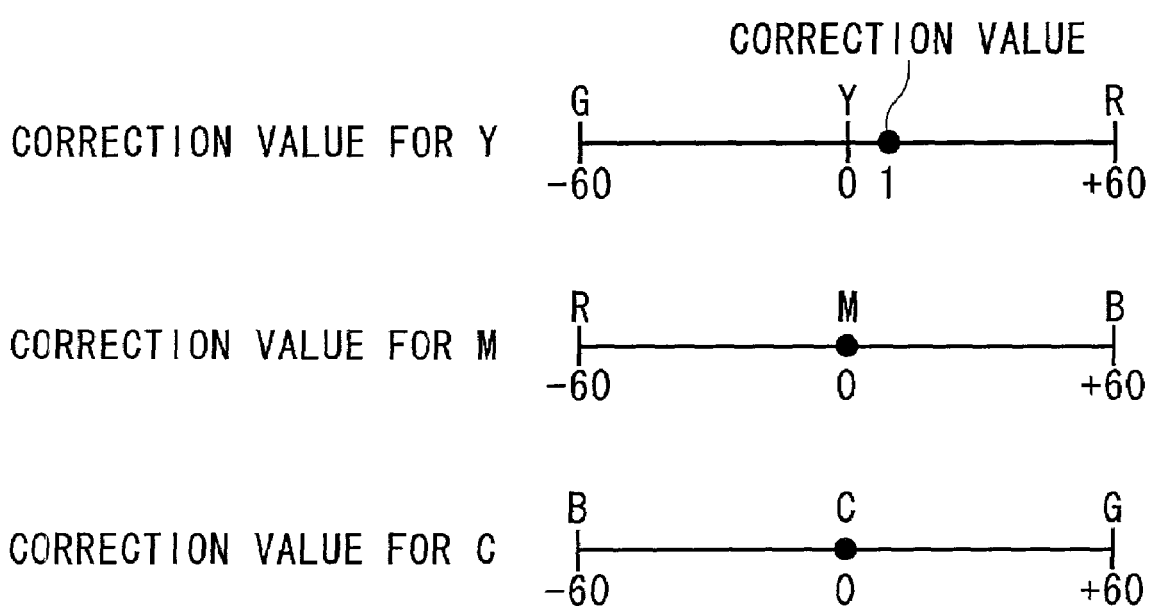
FIG. 6 schematically shows color setting by a user.

FIG. 6 is a diagram for explaining the setting of the color characteristics by the user. The correction for yellow is described as an example. Assuming that yellow (without any color mixed) is represented by a reference point "0", each of a region of hue from yellow to red and a region of hue from yellow to green is divided into 60 levels. In this example, positive correction values indicate correction toward red while negative correction values indicate correction toward green. For example, when the correction value is "+1", yellow to be reproduced by the printer should be corrected toward red by the amount corresponding to one level.

Similarly, for magenta, each of a hue region from magenta to blue and a hue region from magenta to red is divided into 60 levels, where positive correction values indicate correction toward blue. Also, for cyan, each of a hue region from cyan to green and a hue region from cyan to blue is divided into 60 levels, where positive correction values indicate correction toward green.

For black, not shown in FIG. 6, a density region from white to black is divided into 256 levels, where positive correction values indicate correction for increasing the density of black.

FIG. 7 shows an exemplary printer type database 160. The printer type database 160 stores a printer type ID for specifying a type of a printer, and a maker and a model of the printer specified by the corresponding printer ID. Moreover, the printer type database 160 stores color conversion functions for yellow, cyan, magenta and black for each printer type, as shown in FIG. 7.

The contents of the printer type database 160 are used in the following manner. The hues of yellow, cyan, magenta and black reproduced by printers of a particular maker are not always coincident with those reproduced by printers of another maker. Also, even between the printers of the same maker, the hues may be different from each other. Thus, in a case of printing yellow by different printers, for example, colors reproduced by these different printers may be different from each other, and also different from the a color to be reproduced originally. Please note that the color to be reproduced originally may be a color of an image that is displayed by using an RGM color system and is recognized by the user's eyes in many cases. In order to make the color reproduced by the printer closer to the color to be originally reproduced that is the displayed color in many cases, correction is performed. In a case of printing yellow, the function for the correction is expressed by $Fi_y(y, c, m, k, G, B, U)$, where i is a printer ID; y, c, m and k are hues corresponding to yellow, cyan, magenta and black, respectively; G is a color correction factor defined for each type of paper; B is a factor for changing the brightness; and U is the color setting by the user. By using the function, the hue of yellow corrected in such a manner that the hue actually printed becomes closer to the hue to be reproduced is generated. Similar color correction is also performed for each of magenta, cyan and black.

FIG. 8 shows an exemplary paper database 170. It is widely known that the color printed on paper has the brightness and hue that are variable depending on a type of the paper. Therefore, color correction should be performed in accordance with the paper type in order to reproduce the original color or the color recognized by the user's eyes. The contents of the paper database 170 are used for such color correction. The paper database 170 stores a paper ID for specifying a paper type, the paper type, a brightness-correcting factor in accordance with the corresponding paper type and a color conversion factor G that is one of factors of a color conversion function described above referring to FIG. 7.

In the color correction depending on the printer type, a table that is determined for each printer and stored in advance in the correcting information providing apparatus 20 may be used other than the parameters mentioned above. For example, an ICC profile that defines an RGB setting or a CMYB setting for each printer type is suitable for the color correction. The ICC profile may be determined and stored for each paper type.

FIG. 9 shows an exemplary ICC profile database 152 for storing the ICC profiles determined in accordance with the paper types. In the ICC profile database 152, for each paper type the corresponding ICC profile is registered. The ICC profile database 152 can have a plurality of ICC profiles registered therein. Referring to the ICC profile database 152, the color correction considering the printing environment of the terminal unit 10, i.e., the type of the printer to be used and the type of paper to be used can be performed.

FIG. 10 shows an exemplary request number database 180. The request number database 180 can be omitted if necessary, because the contents of the request number database 180 are not directly used for printing. The request number database 180 stores the total number of printing requests to a URL on WWW showing an image that the terminal unit 10 received from the information notifying apparatus 50 and presented to the user. Moreover, the request number database 180 stores, for the corresponding URL, the ranking of the total number of the printing requests and the number of the printing request per day. Based on the contents of the request number database 180, statistical information regarding images printed can be obtained, so that the statistical information can be used as a barometer for estimating public favor. Such statistical information may be provided to the information notifying apparatus 50 from the correcting information providing apparatus 20.

Figure 11:
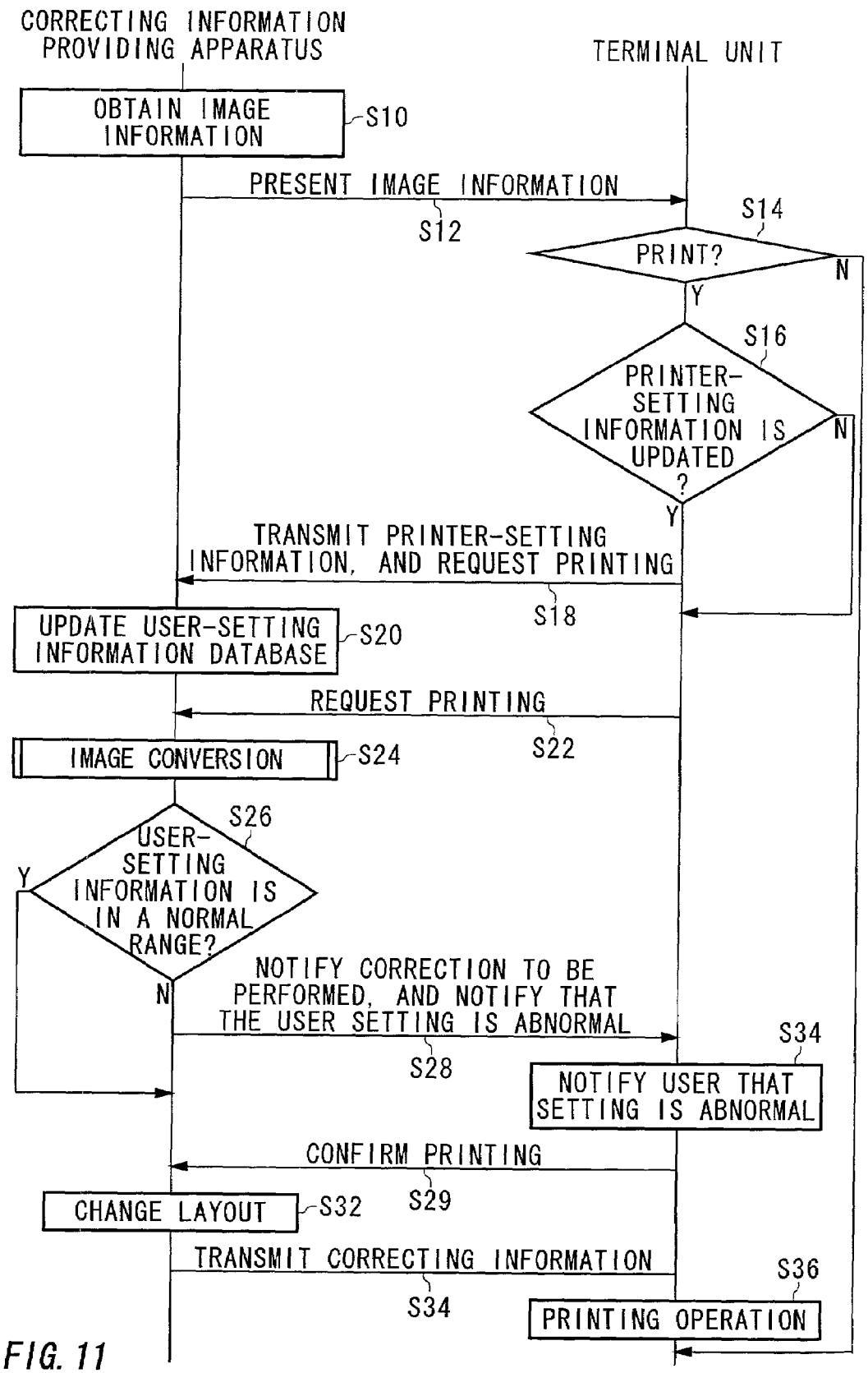
FIG. 11 is a chart of a sequence for providing correcting information corresponding to information to be printed that is obtained by the correcting information providing apparatus, to the terminal unit.

FIG. 11 is a flowchart showing a sequence for providing correcting information corresponding to an image that was obtained and displayed by the terminal unit 10.

When the terminal unit 10 requests the information sending apparatus 30 to send the terminal unit 10 information provided by the information sending apparatus 30 that includes an image via the Internet 40, the information sending apparatus 30 transmits the requested information to the correcting information providing apparatus 20 via the Internet 40 (Step S10). The image received by the correcting information providing apparatus 20 is then transmitted to the terminal unit 10 (Step S12). The terminal unit 10 displays the image contained in the received information and is then placed on a state where the terminal unit 10 allows to the user to determine whether or not the displayed image is to be printed. It is then determined whether or not the displayed image is to be printed (Step S14). When it is determined that the displayed image is not to be printed, this sequence is finished. Otherwise, the terminal unit 10 checks whether or not the printer-setting information has been updated after the previous check (Step S16). When it is determined that the printer-setting information has been updated, the updated printer-setting information and a printing request for the displayed image are transmitted to the correcting information printing apparatus 20. The user-setting information database 150 is then updated based on the transmitted printer-setting information (Step S20). On the other hand, in a case where the printer-setting information was not updated, only the printing request is transmitted to the correcting information providing apparatus 20 (Step S22).

In response to the printing request transmitted in Step S20, the correcting information providing apparatus 20 performs an image conversion operation for the image to be printed so as to obtain correcting information (Step S24). The details of the image conversion operation are described later.

Although the information containing the image provided by the information sending apparatus 30 is received by the terminal unit 10 via the correcting information providing apparatus 20 in the present embodiment, the terminal unit 10 may receive the provided information containing the image directly from the Internet 40 in an alternative embodiment. In this case, the image may be transmitted to the terminal unit 10 and the correcting information providing apparatus 20 simultaneously. Alternatively, the correcting information providing apparatus 20 may obtain the image by accessing a Web page showing the image in response to an input from the terminal unit 10 that specifies a URL of the Web page. In this case, the URL may be transmitted together with the printing request transmitted in Step S18 or S22. The correcting information providing apparatus 20 may obtain the image to be printed by the printer 60 connected to the terminal unit 10 at any time, as long as it obtains the image prior to the image conversion operation in Step S24.

Returning to FIG. 11, after the image conversion operation, the correcting information providing apparatus 20 determines, based on the printer-setting information, whether the color setting by the user is in a normal range (Step S26). The determination may be performed by a controller (not shown) included in the correcting information providing apparatus 20. The normal range may be set considering whether or not colors to be reproduced can be printed actually on paper, and may be set in accordance with the printer type and the paper type. In the present embodiment, the normal range is set to a correction-value range of −5 to +5 for yellow. In a case where the correction value for yellow is out of this range, the colors to be reproduced cannot be actually printed by the printer. Thus, in this case, the correction to be performed is notified by the correction notifying unit 120 (FIG. 4) of the correcting information providing apparatus 20 to the terminal unit 10 (Step S28) so as to allow the user to find that the setting by the user is abnormal (Step S30). After the user confirming the correction to be performed, a printing confirmation is sent to the correction information providing apparatus 20 (Step S29).

When the user finds that the setting of the printer is abnormal, the user can change the setting. At this time, the printer-setting information stored in the terminal unit 10 is also updated. In this case, the updated printer-setting information is sent to the correcting information providing apparatus 20. The correcting information providing apparatus 20 then performs the image conversion and the check of the color setting by the user again based on the updated printer-setting information.

Please note that the check of the color setting by the user may be performed prior to the image conversion operation. In this case, the performed number of the image conversions may be reduced even if the color setting by the user is abnormal.

When it is determined that the color setting is in the normal range or after the correcting information providing apparatus 20 receives the printing confirmation from the terminal unit 10, the layout changing unit 130 of the correction information providing apparatus 20 changes a layout of correcting information including the image in accordance with the size of paper used for printing (Step S32).

The correcting information is then transmitted to the terminal unit 10 (Step S34) and thereafter a printing operation is performed (Step S36). Moreover, the correcting information may be stored in the correcting information storing unit 140 (FIG. 4) of the correcting information providing apparatus 20 so as to allow re-use of the correcting information.

In the present embodiment, since a part of the correcting information corresponding to the image to be printed is information based on the CMYK color system, the correcting information received by the terminal unit 10 maybe transmitted to the printer 60 without conversion from the RGB system to the CMYK system.

Figure 12:
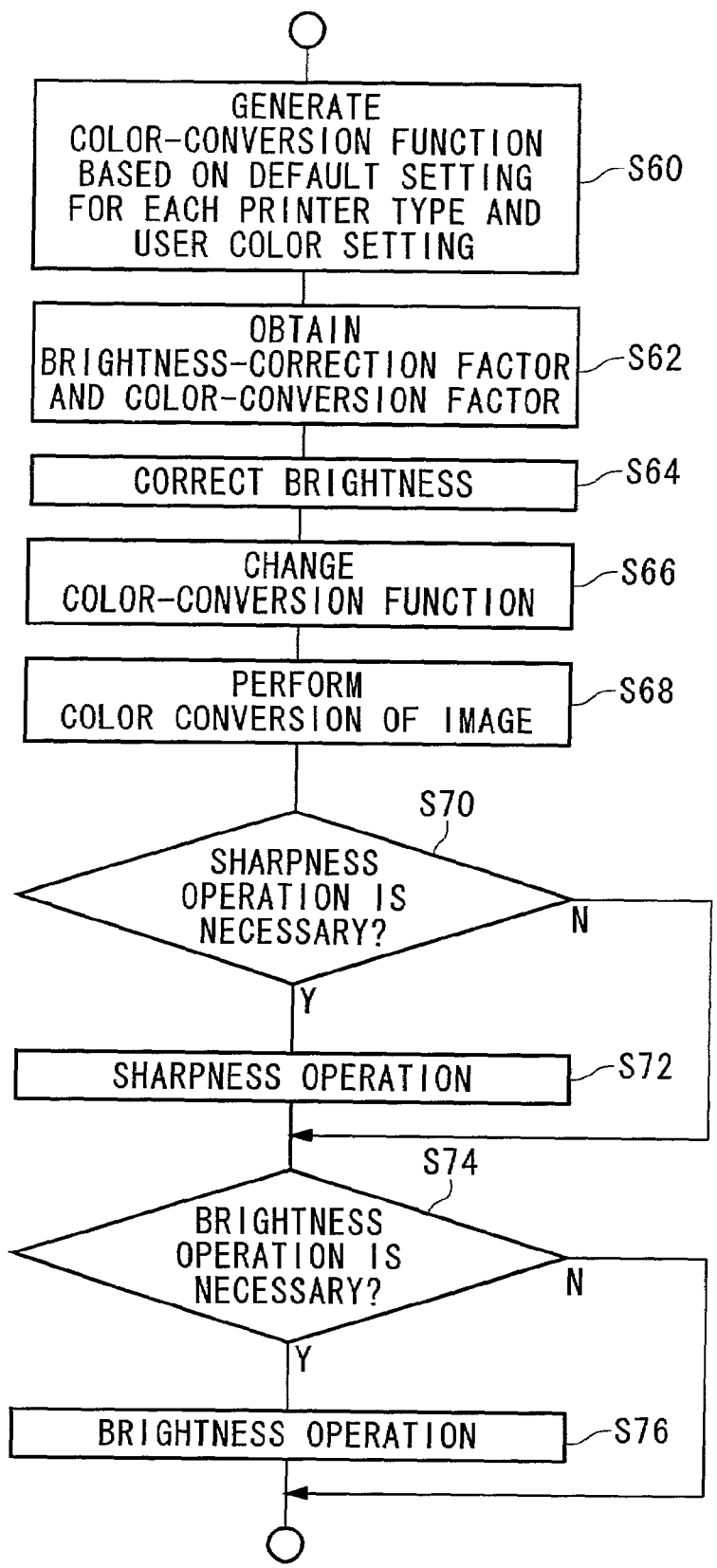
FIG. 12 is a flowchart of an image conversion operation in the sequence shown in FIG. 11.

FIG. 12 is a flowchart of the image conversion operation performed by the correcting information providing apparatus 20 in Step S24 in the flowchart shown in FIG. 11. First, based on the contents of the printer type database 160 and the printer-setting information transmitted from the terminal unit 10, the information correcting unit 100 (FIG. 4) of the correcting information providing apparatus 20 generates a color-conversion function based on a default color-conversion function set in advance in accordance with the type of the printer and the color setting by the user (Step S60). Then, the brightness-correction factor and the color-conversion factor, that correspond to the type of the paper to be used for printing, are read from the paper database 170. The generated color-conversion function is corrected using the brightness-correction factor (Step S64) and the color-conversion factor (Step S66).

Subsequently, color conversion of the image to be printed from the RGM color system to the CMYK color system is performed (Step S68). Then, it is determined whether or not to perform a sharpness operation (Step S70). When the sharpness operation is necessary, the sharpness operation is performed (Step S72). Next, it is determined whether or not to perform a brightness operation (Step S74). When the brightness operation is necessary, the brightness operation is performed (Step S76), thereby the sequence of the image conversion operation is finished.

Figure 13:
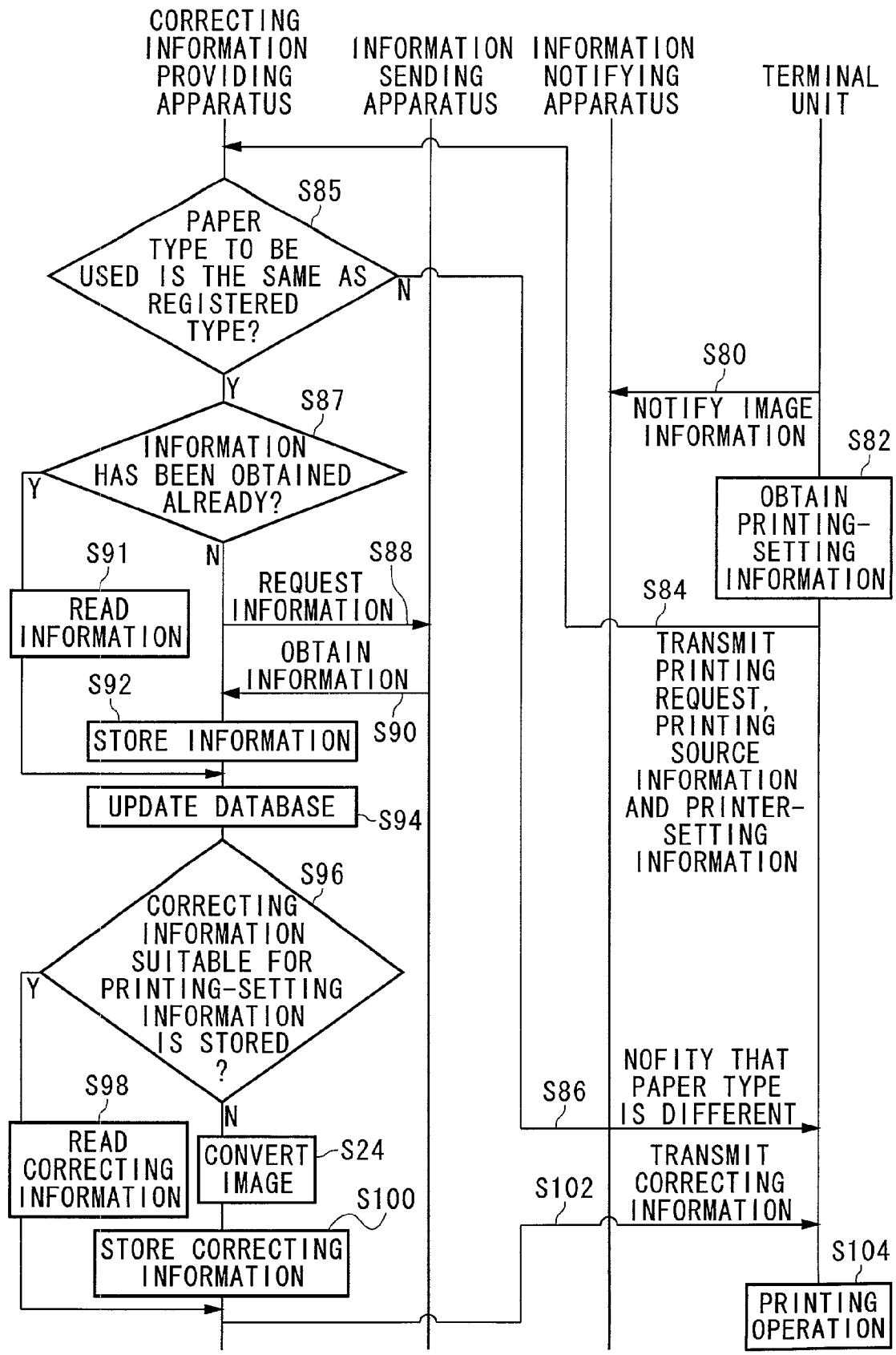
FIG. 13 is a chart of a sequence in which the correcting information providing apparatus transmits correcting information corresponding to information to be printed that is shown on a Web page having a URL notified by an information notifying apparatus to the terminal unit.

FIG. 13 is a chart showing a sequence in which the correcting information is transmitted from the correcting information providing apparatus 20 to the terminal unit 10 in a case where the terminal unit 10 obtains information including an image provided by the information sending apparatus 30 by accessing the Web page having the URL notified from the information notifying apparatus 50 to the terminal unit 10.

First, the information notifying apparatus 50 notifies the URL of the Web page containing the information provided by the information sending apparatus 30 to the terminal unit 10 (Step S80). In a case where the user wishes to print the provided information, the terminal unit 10 obtains the printer-setting information by checking the current setting of the printer (Step S82). The terminal unit 10 may store the printer-setting information therein and compare the stored printer-setting information with the current setting of the printer 60. When the stored printer-setting information is different from the current setting of the printer 60, the stored printer-setting information is updated.

The printing-setting information is then transmitted together with the printing request from the terminal unit 10 to the correcting information providing apparatus 20. In this example, the printing request includes the URL of the Web page containing the information to be printed in order to allow the correcting information providing apparatus 20 to obtain the information to be printed.

Next, based on paper type information contained in the printer-setting information transmitted, it is determined whether or not the paper type is the same as the paper type registered for the terminal unit 10 in the user-setting information database 150 (Step S85). When the paper types are not coincident with each other, the correcting information providing apparatus 20 notifies the terminal unit 10 that the type of the paper accommodated in the printer 60 is different from the registered paper type (Step S86). Thus, the user can find that the accommodated paper is different from the registered paper. After finding the difference of the paper, the user may exchange the accommodated paper for paper of the registered type. Alternatively, the user-setting information database 150 may be updated so as to reflect the paper type information contained in the printer-setting information after confirmation by the user. In this case, the user can find that the correcting information is generated in accordance with the new paper type.

The correcting information providing apparatus 20 then determines based on the printing request whether or not the information for which the printing requested is received has been already stored (Step S87). When, it is determined that the information for which the printing is requested is stored in the correcting information providing apparatus 20, the information is read out (Step S87). In this case, there is no transmission between the correcting information providing apparatus 20 and the information sending apparatus 30, and therefore it takes less time. On the other hand, when it is not determined that the information to be printed is stored in the correcting information providing apparatus 20, the correcting information providing apparatus 20 requests the information sending apparatus 30 specified by the URL transmitted together with the printing request from the terminal unit 10 to transmit the information to be printed (Step S88), and obtains the information to be printed (Step S90). The obtained information to be printed is stored in the correcting information providing apparatus 20 (Step S92).

Subsequently, the user-setting information database 150 is updated based on the printer-setting information transmitted from the terminal unit 10 to the correcting information providing apparatus 20 (Step S94). A person skilled in the art would appreciate that the time at which the user-setting information database 150 is updated is not limited as long as the user-setting information database 150 is updated after the printer-setting information is transmitted to the correcting information providing apparatus 20.

Then, for the information to be printed, it is checked whether or not correcting information in accordance with the printer-setting information is stored in the correcting information storing unit 140 (FIG. 4) (Step S96). When the correcting information is stored, the stored correcting information that corresponds to the printer-setting information is read (Step S98). Otherwise, the image conversion operation is performed in the aforementioned manner so as to obtain the correcting information (Step S24). The obtained correcting information is then stored in the correction information storing unit 140 (Step S100).

The correcting information is then transmitted to the terminal unit 10 (Step S102). When receiving the correcting information, the terminal unit 10 makes the printer 60 to perform the printing operation by using the correcting information (Step S104).

In the above description, the printer 60 receives the information provided in form of CMYK data from the terminal unit 10. Alternatively, the printer 60 may receive the information in form of RGM data and converts the RGB data into the CMYK data. In this case, the printer 60 can be connected directly to the Internet 40, not via the terminal unit 10. Moreover, the terminal unit 10 and the printer 60 may be integrated into a single apparatus.

As is apparent from the above, according to the present invention, an image provided on the Internet can be printed with colors to be reproduced originally without being affected by the differences between the printing environments.

Although the present invention has been described by way of exemplary embodiments, it should be understood that those skilled in the art might make many changes and substitutions without departing from the spirit and the scope of the present invention which is defined only by the appended claims.

What is claimed is:

1. A printing system for printing a color image having a predetermined color information provided via the Internet, comprising:
   a terminal unit, comprising an input device through which a user's printing request is input and printer-setting information is updated, connected to said Internet, operable to obtain said color image;
   a printer, connected to said terminal unit, operable to print said color image; and
   a correcting information provider operable to obtain a current setting including at least color characteristics of the printer, and to provide said terminal unit with correcting information for allowing said printer to print out said predetermined color information of said color image in accordance with at least color characteristics of said printer.

2. A printing system as claimed in claim 1, wherein said correcting information provider is connected to said terminal unit.

3. A printing system as claimed in claim 2, wherein said correcting information provider is connected to said terminal unit via said Internet.

4. A printing system as claimed in claim 1, wherein said correcting information provider includes a printer type database for storing information regarding color characteristics for each type of said printer, and said correcting information provider provides said correcting information obtained by color correction based on the contents of said printer type database.

5. A printing system as claimed in claim 4, wherein said information regarding said color characteristics is a color correction table to be used for said color correction in accordance with said color characteristics of said printer.

6. A printing system as claimed in claim 1, wherein said correcting information provider provides said correcting information in accordance with at least color characteristics of said printer and a type of paper to be used by said printer.

7. A printing system as claimed in claim 6, wherein said correcting information provider includes a user-setting information database for storing printer-setting information regarding a current color setting of said printer, a type and a size of paper to be used by said printer, and said correcting information provider provides said correcting information based on said printer-setting information.

8. A printing system as claimed in claim 7, wherein said terminal unit transmits a type of paper currently accommodated in said printer to said correcting information provider, said correcting information provider determines whether or not said current paper type is the same as said paper type stored in said user-setting information database, and notifies said terminal unit that said current paper type is different from said stored paper type stored when said current paper type is different from said stored paper type.

9. A printing system as claimed in claim 7, wherein said correcting information provider includes a correction notifying unit operable to notify said terminal unit that said current setting is out of a predetermined region for a desired setting.

10. A printing system as claimed in claim 7, wherein said correcting information provider includes a layout unit operable to make a layout of said image based on said size of paper.

11. A printing system as claimed in claim 7, wherein said user-setting information database is operable to store information regarding brightness and sharpness of said image, and said correcting information provider provides said correcting information based on said printer-setting information and said information regarding said brightness and said sharpness of said image.

12. A printing system as claimed in claim 1, wherein said correcting information provider includes:

an image obtaining unit operable to obtain said image from said Internet; and an information presenting unit operable to present said image to said terminal unit, wherein said terminal unit obtains said image via said information presenting unit.

13. A printing system as claimed in claim 1, wherein said correction information provider includes a correction notifying unit operable to notify the user of said terminal unit the contents of correction to be performed for said image.

14. A printing system as claimed in claim 13, wherein said correction notifying unit determines whether or not said color characteristics of said printer are in normal regions, and notifies said terminal unit that said color characteristics are abnormal when said color characteristics of said printer are out of said normal regions.

15. A printing system as claimed in claim 1, wherein said terminal unit includes:

an image receiving unit operable to receive said color image;

an image displaying unit operable to display said color image received; and a correcting information requesting unit operable to request said correcting information provider to provide said terminal unit with said correcting information corresponding to said color image.

16. A printing system as claimed in claim 15, wherein said terminal unit further includes:

a printer-setting obtaining unit operable to obtain a current setting of said printer; and a printer-setting information transmitting unit operable to transmit said current setting of said printer to said correcting information provider when said terminal unit requests the transmission of said correcting information to said correcting information provider.

17. A printing system as claimed in claim 1, wherein said correcting information provider includes a storing unit operable to store said correcting information so as to allow re-use of said correcting information for the next correcting operation.

18. A printing system as claimed in claim 17, wherein said correcting information determines whether or not said correcting information is stored in said storing unit, and reads said correcting information when it is determined that said correcting information is stored and transmits said read correcting information to said terminal unit.

19. A printing system as claimed in claim 1, further comprising:

an information sending apparatus operable to provide said color image on the Internet; and an information notifying apparatus operable to provide location information indicating a location of said color image on the Internet, wherein said correcting information provider obtains said color image based on said location information and provides said correcting information corresponding said color image to said terminal unit.

20. A printing system as claimed in claim 19, wherein said correcting information provider includes a request number database operable to store the number of printing requests for each of a plurality of color images, and said correcting information provider notifies said information notifying unit said number of said printing requests in a predetermined period.

21. A printing system as claimed in claim 19, wherein said terminal unit includes:

a receiving unit operable to receive said location information; and a correcting information requesting unit operable to request said correcting information provider to provide said terminal unit with said correcting information corresponding to said color image and to transmit said location information to said correcting information provider.

22. A printing system as claimed in claim 21, wherein said terminal unit further includes:
   a printer-setting obtaining unit operable to obtain a current setting of said printer; and
   a printer-setting information transmitting unit operable to transmit said current setting of said printer to said correcting information provider when said terminal unit requests the transmission of said correcting information to said correcting information provider.

23. A printing system as claimed in claim 19, wherein said correcting information provider includes a storing unit operable to store said correcting information so as to allow re-use of said correcting information for the next correcting operation.

24. A printing system as claimed in claim 23, wherein said correcting information determines whether or not said correcting information is stored in said storing unit, and reads said correcting information when it is determined that said correcting information is stored and transmits said read correcting information to said terminal unit.

25. A method of supplying correcting information for a color image having a predetermined color information provided via the Internet to a printer connected to the Internet, comprising:
   inputting a user's printing request and updating printer-setting information via an input device of a terminal unit which is connected to the Internet and operable to obtain the color image;
   obtaining a current setting including at least color characteristics of the printer;
   obtaining the color image from the Internet; and
   providing the printer with correcting information for allowing said printer to print out said predetermined color information of said color image in accordance with said current setting of the printer.

26. A printing method as claimed in claim 25, wherein said current setting of said printer includes at least color characteristics of said printer.

27. A printing method as claimed in claim 26, wherein said current setting of said printer includes a size and a type of paper to be used by said printer, and said printer prints said color image by using said correcting information provided in accordance with said color characteristics of said printer and said size and type of said paper.

28. A color image correcting information providing system for a color image having a predetermined color information provided via the Internet, comprising:
   means for inputting a user's printing request and updating printer-setting information via an input device of a terminal unit which is connected to the Internet and operable to obtain the color image;
   means for obtaining a current setting including at least color characteristics of a printer connecting to the Internet; and
   means for supplying to the printer via the Internet correcting information which allows said printer to print out said predetermined color information of said color image in accordance with said current setting of the printer.

29. A printing apparatus as claimed in claim 1, wherein said correcting information provider corrects said color image in accordance with at least color characteristics of said printer, so that said correction information is calculated as corrected color image.

30. A printing system for printing a color image having a predetermined color information provided via the Internet, comprising:
   a terminal unit connected to said Internet, operable to obtain said color image;
   a printer, connected to said terminal unit, operable to print said color image; and
   a correcting information provider operable to obtain a current setting including at least color characteristics of the printer, and to provide said terminal unit with correcting information for allowing said printer to print out said predetermined color information of said color image in accordance with at least color characteristics of said printer,
   wherein said predetermined color is the original color of an item shown on an advertisement provided via the Internet.

* * * * *